(12) United States Patent
Blaschke et al.

(10) Patent No.: US 6,284,295 B1
(45) Date of Patent: *Sep. 4, 2001

(54) READY TO BAKE REFRIGERATED COOKIE DOUGH

(75) Inventors: Dieter Blaschke, La Tour-De-Peilz; Peter Nairn, St-Legier, both of (CH)

(73) Assignee: Nestec SA, Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/502,447

(22) Filed: Feb. 11, 2000

Related U.S. Application Data

(63) Continuation-in-part of application No. 09/130,117, filed as application No. PCT/EP97/07190 on Dec. 17, 1997, now Pat. No. 6,024,997.

(30) Foreign Application Priority Data

Dec. 19, 1996 (EP) .................................................. 96203630

(51) Int. Cl.[7] .................................................. A21D 10/02
(52) U.S. Cl. .............................. 426/144; 426/76; 426/94; 426/128; 426/549
(58) Field of Search ............................... 426/128, 76, 94, 426/549, 144

(56) References Cited

U.S. PATENT DOCUMENTS

| | | | |
|---|---|---|---|
| 1,319,899 | 10/1919 | Rafert | 426/76 |
| 1,929,358 | 10/1933 | Keefer | 426/76 |
| 1,952,698 | 3/1934 | Willem | 31/5 |
| 3,024,112 | 3/1962 | Burgess | 426/497 |
| 3,397,064 | 8/1968 | Matz | 99/90 |
| 3,765,909 | 10/1973 | Moline | 99/192 R |
| 4,215,104 | 7/1980 | Ullman et al. | 424/15 |
| 4,445,835 | 5/1984 | Wasserbach | 425/131.1 |
| 4,517,209 | 5/1985 | Thornton et al. | 426/383 |
| 4,777,057 | 10/1988 | Sugisawa et al. | 426/412 |
| 4,859,473 | 8/1989 | Arcisszewski et al. | 426/19 |
| 4,900,577 | 2/1990 | Arciszewski et al. | 426/563 |
| 5,049,399 | 9/1991 | Huang et al. | 426/87 |
| 5,171,599 | 12/1992 | Weber | 426/549 |
| 5,349,759 | 9/1994 | Anton et al. | 33/524 |
| 5,523,107 | 6/1996 | Wallin | 426/549 |
| 6,024,997 | * 2/2000 | Blaschke et al. | 426/144 |

FOREIGN PATENT DOCUMENTS

| | | |
|---|---|---|
| 1338372 | 6/1996 | (CA) . |
| 94 17 488 | 1/1995 | (DE) . |
| 0 084 210 | 7/1983 | (EP) . |
| 0 145 550 | 6/1985 | (EP) . |
| 0 214 707 | 3/1987 | (EP) . |
| 0 900 527 A2 | 3/1999 | (EP) . |
| 461263 | 3/1937 | (GB) . |
| 90/01877 | 3/1990 | (WO) . |
| WO 92/10101 | 6/1992 | (WO) . |
| WO 97/31539 | 9/1997 | (WO) . |

OTHER PUBLICATIONS

Copy of packaging for "Snap to Bake Cookies" manufactured by Pampas, A Division of Quality Bakers Australia Limited.

Riddle, J.S., "Frookies to Offer Cookies to In–Store Departments," Supermarket News, 40(26):40 (1990).

Brochure from Ready–Bake International titled "Gourmet Cookies".

* cited by examiner

*Primary Examiner*—Lien Tran
(74) *Attorney, Agent, or Firm*—Winston & Strawn

(57) ABSTRACT

A ready-for-use refrigerated cookie dough and which is prepared from flour, sugar, baking powder and fat, containing from about 0.1% to about 1.5% baking powder and provided in a form that includes grooves, score lines, or a combination thereof, to facilitate separation of the dough into pieces that can be baked into individual cookies.

20 Claims, 2 Drawing Sheets

READY TO BAKE REFRIGERATED COOKIE DOUGH

CROSS REFERENCE TO RELATED APPLICATION

This application is a continuation-in-part of U.S. patent application Ser. No. 09/130,117 filed Aug. 6, 1998, now U.S. Pat. No. 6,024,997 which is a continuation of PCT/EP97/07190 filed Dec. 17, 1997.

BACKGROUND ART

The invention is directed to a ready-for-use cookie dough which can be preserved in the refrigerator or freezer and which is typically prepared from flour, sugar, baking powder fat, water and other ingredients, such as water, texturing agents, natural and artificial flavors, inclusions, egg, and salt.

Ready made cookie dough already exist on the market. Typically, the dough is packaged either in a cylindrical shape or packaged in a cup. During use, the consumer uses a spoon or a knife to form the cookie in a circular shape prior to baking. This particular cookie dough preparation requires extensive manipulation of the cookie dough prior to use. If the cookie dough is packaged in the form of a block, then a forming device is needed in order to give the cookie the desired circular form. This cookie dough manipulation, however, leaves remnants of cookie dough pieces which must then be recycled and reshaped if desired.

SUMMARY OF THE INVENTION

The present invention is direct to a consumer ready-for-baking cookie dough which requires only a minimum amount of manipulation during use and which does not leave any dough pieces to be reshaped or recycled.

The present invention also is directed to a ready-for-use cookie dough which can be preserved in the refrigerator or freezer. Typically, the cookie dough is prepared from flour, sugar, baking powder fat, water and other ingredients and it includes baking powder in the amount from about 0.1% to about 1.5% by weight. Additionally, the cookie dough is provided in a form ready for baking having grooves, score lines, or a combination thereof which define pieces of dough that are to be broken off and baked into cookies.

BRIEF DESCRIPTION OF THE DRAWINGS

The remainder of the description is made with reference to the drawings wherein.

DETAILED DESCRIPTION OF THE INVENTION

Figure 1:
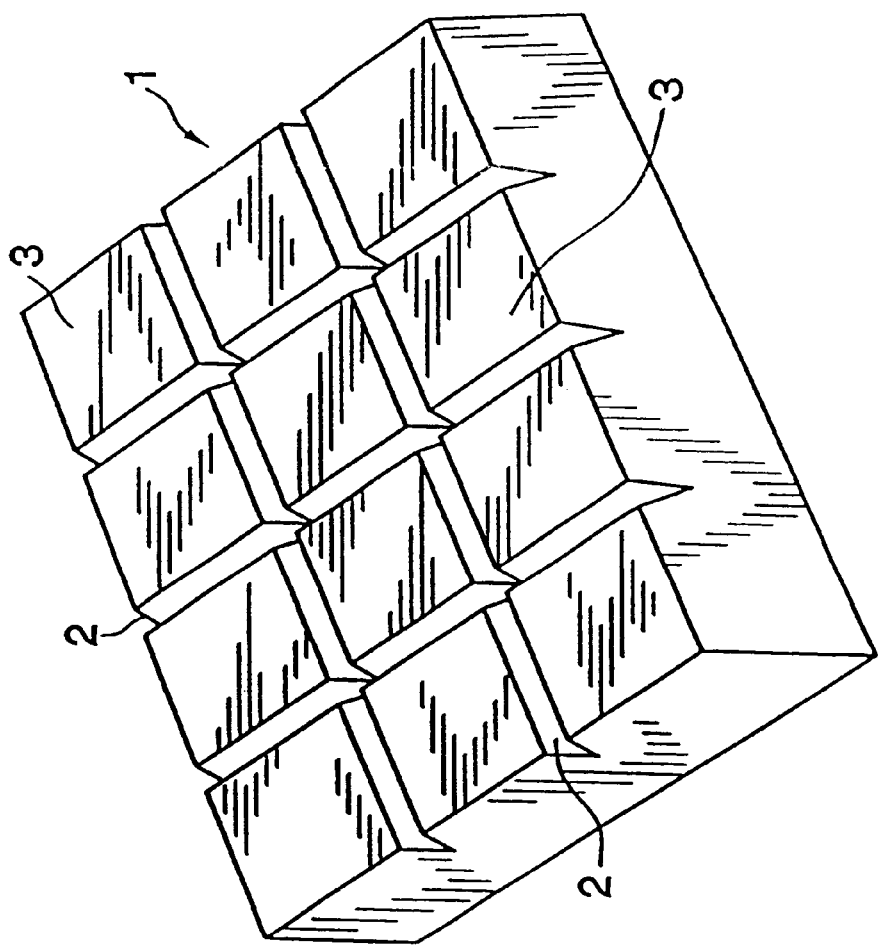
FIG. 1 is a perspective view of a rectangular block (1) of cookie dough prepared with intersecting grooves that define pieces of dough that can be broken off and baked into cookies.

The cookie dough according to the invention can have several shapes. Preferably, the cookie dough is shaped into a block or sheet. The block may be either of parallelepipedal shaped, cylindrical shape, or prismatic shape. When the dough has baking powder in an amount from about 0.1% to about 1.5%, the dough can be easily cut into the shape of a parallelepipedal, circular or prismatic block. Subsequently, the shaped dough is placed on a baking tray and baked. During baking, the baking flow shapes the dough into a circular shape.

In one embodiment, a block of dough has either an imprint or a precut, to facilitate breaking the dough into small blocks. The imprint or precut facilitates breaking the either frozen or thawed dough, prior to baking. The block of dough with either an imprint or precut can be broken into small blocks by using a knife or by hand. When using a knife, the knife completely cuts the block of dough beyond the imprint or precut. Alternatively, the block of dough can be pulled apart using one's hands. As long as the block of dough has an imprint or a precut, the dough can be either cut or pulled into rectangular pieces, circular pieces or triangular pieces. There is no waste due to shaping and no manipulation, other than cutting, by the consumer.

As used herein, "baking powder" means a mixture of at least one bicarbonate or carbonate salt, at least one acidifying agent and at least one separating agent. These ingredients and adequate substitutes are commonly known to one of ordinary skill in the art, therefore, any known ingredient or substitute can be used with the invention. Preferably, sodium bicarbonate is used with sodium diphosphate or disodium dihydrogen pyrophosphate and a starch as separating agent. These mixtures are directly available commercially with a fixed composition. Typically, a mixture of baking powder comprises bicarbonate in an amount of about 30%, acid in an amount of about 40%, and a separating agent in an amount of about 30% by weight. In a specific embodiment, sodium bicarbonate may be used alone in an amount of about 0.2 to 0.7%, preferably about 0.5% by weight.

Any type of flour can be used. Typically, the flour can be a cereal flour with a high or low protein content. The flour content is normally from about 10% to about 40%, preferably from about 27% to about 34% by weight.

The sugar used can be of any type. Sugars include, but are not limited to, fructose, sucrose, dextrose, corn syrup, glucose, lactose, galactose, or mixtures thereof Preferably, sucrose is used, such as, in the form of granulated sugar. To increase dough sweetness, a sugar substitute such as sorbitol or any other known sugar substitute can be added either in conjunction with sugar or as a substitute for the sugar. Advantageously, sucrose helps preserve the dough during refrigeration, i.e., sucrose allows the dough to be somewhat hard, yet spread well during baking to form a circular shape. The sugar can be in an amount from about 5% to about 50%, preferably, in an amount from about 10% to about 40% by weight.

The cookie dough should have a moisture or water content from about 2% to about 15%, preferably from about 6% to about 9% by weight.

The type of fat has an influence on the flow capacity of the dough during baking. The fat used in the dough composition according to the invention can be a solid or liquid fat at room temperature. The fat can be of animal or plant origin, such as, lard, tallow, butter oil, butter, margarine, corn oil, copra oil, palm oil, sunflower oil, soya bean oil, coconut oil, palm kernel oil, cotton oil, peanut oil, olive oil, or mixtures thereof. The fats can be emulsified or stabilized with mono- or diglycerides or other emulsifiers known in the art. For example, margarine, which already contains an emulsifier, can be used. Typically, fat is present in an amount from about 5% to about 35%, preferably in an amount from about 10% to about 25% by weight.

Optionally, a texturing agent can be used. One of ordinary skill in the art can determine the appropriate texturing agent with little or no experimentation. Preferably, a texturing agent includes whole egg or egg white. Typically, the texturing agent can be in an amount from about 0.1% to about 10%, preferably in an amount from about 2% to about 5% by weight.

The dough according to the invention may also contain natural or artificial flavoring agents, including but not limited to, vanilla flavor, cinnamon, and cocoa powder. These are typically used in an amount of about to 0.01% to about 2% by weight, and preferably from 0.25 to 1 % by weight.

Optionally, the dough may contain inclusions. Inclusions include, but are not limited to, chocolate pieces, oat flake pieces, groundnut pieces, hazelnuts either in pieces or whole, caramel, nuts, or mixtures thereof. The inclusions can be any edible size, typically from about 1 mm to about 10 mm, preferably from about 4 mm to about 8 mm. Optionally, dark chocolate, milk chocolate, white chocolate or mixtures thereof may be used. Typically, chocolate is in an amount from about 5% to about 50%, preferably in an amount from about 10% to about 30% by weight. The chocolate can be a commercial chocolate or a chocolate used in pastry making or in catering.

According to the invention the block of dough is sufficiently thick to form a cookie of edible size upon baking. This feature avoids further dough manipulation either by rolling or folding the dough. Typically, the block of dough has a thickness of from about 1 cm to about 5 cm, preferably, from about 1 cm to about 3 cm.

Typically, the block of dough is cut prior to packaging. Preferably, the block of dough is precut into parallelepipedal blocks from about 2 cm to about 5 cm, preferably from about 3 cm to about 4 cm in size and with a thickness from about 1 cm to about 5 cm, preferably from about 1 cm to about 3 cm. If the dough is shaped into a disk or cylinder, the cylinder typically has a diameter from about 2 cm to about 8 cm, preferably from about 3 cm to about 6 cm and a thickness from about 1 cm to about 5 cm, preferably from about 1 cm to about 3 cm. If the block of dough is shaped into a prismatic block, typically, the prismatic block has a thickness from about 1 cm to about 3 cm and an equilateral triangle with sides measuring from about 2 cm to about 8 cm, preferably from about 3 cm to about 6 cm.

The dough is prepared and molded and/or cut using conventional methods. Once the block (1) is formed, marker rolls form grooves (2) as the rolls pass over the block of dough. Optionally, either scores lines (4), grooves (5), or a combination thereof (6) can be made. After the preparation, the individual cookies can be broken off one by one, various blocks are formed, placed on a tray, and baked in an oven.

The blocks are typically prepared to break the cookie dough block into predetermined sizes using grooves, score lines, or a combination thereof. The predetermined size can be any convenient size, however, the size should be sufficiently large to bake a cookie. The groove, score line, or combination thereof, are typically made using marker rolls or any other apparatus known to those skilled in the art. The groove, score line, or combination depth should be sufficient to allow the consumer to either break the blocks, as done with a typical chocolate bar, or pull the blocks apart. A knife can be used to finish cutting along the grooves, although this should not be necessary. Typically, the depth of the groove, score line, or combination thereof is from about 1 mm to about 20 mm, preferably from about 1 mm to about 10 mm, more preferably from about 1 mm to about 5 mm. Typically, the width of the groove, score line or combination thereof, is from about 1 mm to about 10 mm, preferably from about 1 mm to about 5 mm. When using a combination of groove and score line, the groove is typically of a depth from about 1 mm to about 15 mm and the depth of the score line from about 5 mm to about 19 mm, preferably, the groove is from about 5 mm to 10 mm wide, and the score line is from about 10 mm to about 15 mm wide. In a combination, typically the width of the groove is from about 1 mm to about 8 mm, and the width of the score line is from about 2 mm to about 9 mm, preferably the groove is from about 1 mm to about 5 mm wide and the score line is 5 mm to about 9 mm. Alternatively, the depth and width of the grooves, score lines, or combination may be defined as a ratio or percentage of the block thickness. The groove, score line, or combination depth is from about 3% to about 95%, preferably from about 5% to about 50%, more preferably from about 7.5% to about 35% of the block thickness. The groove, score line, or combination width is from about 0.5% to 50%, preferably from about 1% to about 35%, and even more preferably from about 5% to about 25% of the block thickness. When using a combination of groove and score line the depth of the groove is from about 5% to about 75% and the score line depth from 25% to about 95% of the combination, preferably the groove is from about 25% to about 50% wide and the score line is from about 50% to about 75% of the combination. When using a combination of grooves score line, the width of the groove is from about 10% to about 80% of the combination, and the width of the score line is from about 20% to about 90% of the combination, preferably the groove is from about 10% to about 50% of the combination and the score line is from about 50% to 90% of the combination. The grooves, score lines, or combination do not cut through the entire thickness of the dough. The grooves are normally pre-scored in a V-like shape, a straight vertical cut which is essentially perpendicular to the cookie dough surface, or a combination thereof, although other configurations, such as U-shaped, rounded or rectangular grooves, can be used.

The combination of groove and score lines is particularly useful when the block of dough is made from a soft dough. Softer dough are typically of a creamy texture and may also be high in moisture content. The soft dough are generally used for soft type cookies such as oatmeal or raisin cookies among others.

As a practical embodiment, the dough thickness may be about 2 cm for 3.5 cm×3.5 cm blocks. For a 300 g block, there would be 3×3 blocks, for a block of 400 g, 3×4 blocks and for a 500 g block 3×5 blocks.

Once the blocks are separated, the blocks are arranged on an oven tray and baked. One of ordinary skill in the art with little or no experimentation can determine the appropriate baking conditions for the oven being used. Baking can be carried out using a conventional oven at a temperature from about 180° C. to about 200° C. for about 12 minutes to about 18 minutes. After baking, a cookie having a diameter of about 7 cm is obtained from blocks of 3.5 cm×3.5 cm. According to the invention, the dough forms substantially rounded cookies from blocks which are substantially square shaped.

The block of dough can be wrapped using conventional methods. The wrapping should protect the dough from air and moisture. Typically, the wrapping is made of synthetic material or based on covered carton. Optionally, the dough can be frozen either prior or after packaging. Thereafter the dough can be stored either in a refrigerator or a freezer. The shelf life of the dough in a refrigerator is typically of several months and of several months in a typical freezer.

Figure 2C:
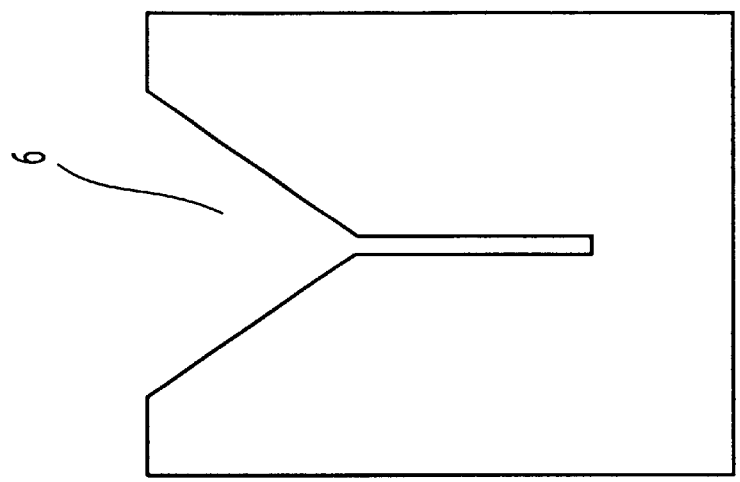
FIGS. 2a, 2b and 2c are enlarged cross-sectional views of a cookie block having score lines (2a), grooves (2b), and combinations thereof (2c).
Figure 2B:
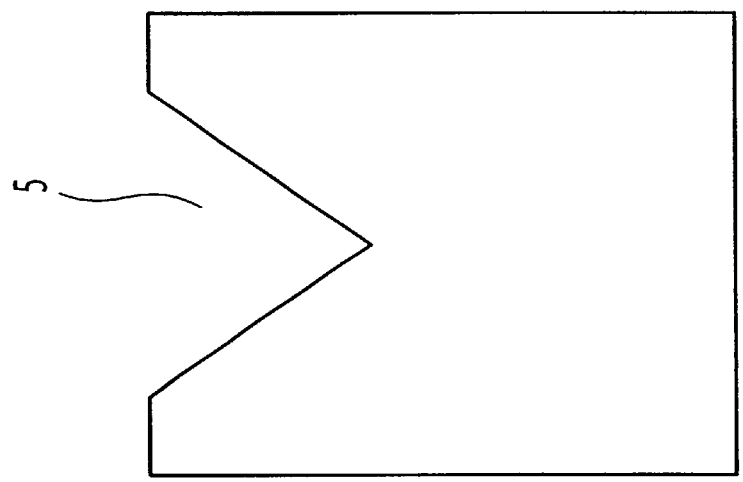
Figure 2A:
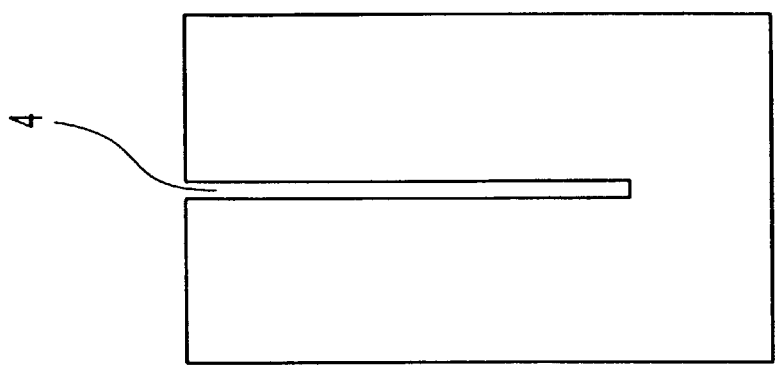

As described in the figures, FIG. 1 illustrates a block of cookie dough formed into a parallelepipedal shape (1) using conventional methods. Thereafter, marker rolls form intersecting grooves (2) on the surface to define blocks of dough (3). The blocks of dough are then pulled apart, placed on a baking sheet, and baked in an oven to form cookies. FIG. 2 is a cross sectional view of a score line (4) with a depth of about 75% and a width of about 5% of the thickness of the block of dough (FIG. 2a), a groove (5) with a depth of about 30% and a width of about 35% to about 5% of the thickness of the block of dough (FIG. 2b), and a combination (6) wherein the groove has a depth of about 30% and a width of about 35% to about 5% of the thickness of the block of dough and the score line has a depth of about 40% and a width of about 5% of the thickness of the block of dough (FIG. 2c).

EXAMPLES

The remainder of the description is made with reference to the examples.

Examples 1 to 4

The various ingredients stated in the table below are mixed: the proportions are in % by weight.

| EXAMPLES | 1 | 2 | 3 | 4 |
|---|---|---|---|---|
| Sugar | 33.5 | 34 | 33.8 | 34.1 |
| Whole Egg | 3.5 | 3.5 | 3.5 | 3.5 |
| Baking Powder | 0.7 | 1 | 1.5 | 1.5 |
| Salt | 0.3 | 0.3 | 0.3 | 0.3 |
| Fat | 12.8 | 12.9 | 12.8 | 13 |
| Water | 4.4 | 3.2 | 3.2 | 2.1 |
| Flavorings | 0.6 | 0.5 | 0.6 | 0.7 |
| Flour | 28 | 28.3 | 28.1 | 28.4 |
| Chocolate pieces | 16.2 | 16.3 | 16.2 | 16.4 |

The dough thus prepared is stored for 3 weeks in the refrigerator and 3.5×3.5 cm blocks are then made. After baking for 16 minutes at 180° C., cookies 7 cm in diameter are obtained.

For Example 1, the dough is considered too soft, for Examples 2 and 3, it is a little soft and example 4, the consistency is judged to be good, in the light of the possibility of manufacturing the dough on an existing production line. In the 4 cases, the dough blocks flow in a manner which is quite circular.

The embodiments of the invention described above are intended to be merely exemplary, and those skilled in the art will recognize, or will be able to ascertain using no more than routine experimentation, numerous equivalents of the specific materials, procedures, and devices described herein. All such equivalents are considered to be within the scope of the invention and are encompassed by the appended claims.

What is claimed is:

1. A ready-for-use refrigerated cookie dough which is prepared from flour, sugar, baking powder and fat, wherein the baking powder is present in an amount of between about 0.1% and 1.5% by weight and the dough is provided in a form of a sheet or block having a thickness and a surface which includes thereon grooves, score lines, or a combination thereof to define pieces of the dough to be broken off and baked into cookies, wherein the grooves, score lines or combination thereof having a width of between about 0.5% to about 50% of the thickness of the dough sheet or block and a depth of about 3% to 95% of the thickness of the dough sheet or block.

2. The cookie dough according to claim 1, in the form of a parallelepipedal, cylinder, prismatic block, or equilateral triangle having a thickness of from about 1 to 5 cm.

3. The cookie dough according to claim 2, wherein the block is a parallelepipedal block from about 3 cm to about 4 cm in size.

4. The cookie dough according to claim 2, wherein the grooves, score lines, or combination thereof have a width of between about 1 and 5 mm and a depth of between about 1 and 5 mm.

5. The cookie dough according to claim 1, wherein the groove, score line, or combination thereof has a depth from about 5% to about 50% of the block thickness.

6. The cookie dough of claim 1, wherein the groove has a depth of about 5% to 75% of the block thickness and a width of between about 1% to 35% of the block thickness.

7. The cookie dough according to claim 1, wherein the surface includes at least one combined groove and score line wherein the groove is closest to the surface of the dough.

8. The cookie dough according to claim 1, having a flat circular shape with a diameter from about 3 cm to about 6 cm and a thickness from about 1 cm to 3 cm.

9. The cookie dough according to claim 1, which contains from about 6% to about 9% water.

10. The cookie dough according to claim 1, in the form of a sheet wherein the surface includes V-shaped, U-shaped, rounded or rectangular grooves, rectangular score lines or combinations therein.

11. The cookie dough according to claim 1, further including pieces of chocolate in an amount from about 5% to about 50% by weight of the dough.

12. The cookie dough according to claim 11, wherein the chocolate pieces are from about 1 mm to about 10 mm in size.

13. The cookie dough according to claim 1, wherein the flour is present in an amount from about 10% to about 40% by weight, the sugar is present in an amount from about 10% to about 40% by weight, and the fat is present in an amount from about 10% to a about 25% by weight, a texturing agent is present in an amount of up to about 10% by weight, and a flavoring agent is present in an amount of up to 2% by weight.

14. The cookie dough according to claim 13, wherein the texturing agent is whole egg or egg white and is present in an amount of about 2% to about 5% by weight and the flavoring agent is vanilla, cinnamon or cocoa and is present in an amount of about 0.25% to 1% by weight.

15. The cookie dough according to claim 1, wherein the fat is a solid or liquid at room temperature and of animal or plant origin.

16. The cookie dough according to claim 15, wherein the fat is lard, tallow, margarine, corn oil, copra oil, palm oil, sunflower oil, soya bean oil, coconut oil, palm kernel oil, cotton oil, peanut oil, olive oil, or a mixture thereof.

17. The cookie dough according to claim 1, wherein the baking powder is a mixture of at least one bicarbonate or carbonate salt, at least one acidifying agent, and at least one separating agent.

18. The cookie dough according to claim 1, wherein the baking powder is bicarbonate, in an amount of at least 0.5% by weight.

19. The cookie dough according to claim 7, wherein the groove has a depth of about 5% to about 75% and a width of about 10% to about 80% of the combined groove and score line, and the score line has a depth of about 25% to about 95% and a width of about 20% and 90% of the combined groove and score line.

20. The cookie dough of claim 1 wherein the grooves, score lines or combinations thereof intersect to define dough pieces therebetween.

* * * * *

UNITED STATES PATENT AND TRADEMARK OFFICE
CERTIFICATE OF CORRECTION

PATENT NO.    : 6,284,295 B1
DATED         : September 4, 2001
INVENTOR(S)   : Blaschke et al.

It is certified that error appears in the above-identified patent and that said Letters Patent is hereby corrected as shown below:

<u>Title page,</u>
Item [63] Related U.S. Application Data, after "09/130,117," delete "filed as" and insert -- now Pat. No. 6,024,997, which is a continuation of --;
after "PCT/EP97/07190" insert -- filed --;
after "Dec. 17, 1997" delete ", now Pat. No. 6,024,997".

Signed and Sealed this

Twenty-sixth Day of February, 2002

Attest:

JAMES E. ROGAN
Attesting Officer        Director of the United States Patent and Trademark Office